(12) United States Patent
De Lange et al.

(10) Patent No.: US 6,559,087 B1
(45) Date of Patent: May 6, 2003

(54) METHOD AND APPARATUS FOR THE CONTINUOUS TREATMENT OF CATALYST AND CATALYST SUPPORT MATERIAL

(75) Inventors: Paulus De Lange, Wesseling (DE); Rainer Karer, Kaiserslautern (DE); Philipp Rosendorfer, Neustadt (DE); Kaspar Evertz, Schifferstadt (DE); Wolfgang Micklitz, Neustadt (DE); Hans-Jacob Feindt, Flemington, NJ (US)

(73) Assignee: Basell Polyolefins GmbH (DE)

( * ) Notice: Subject to any disclaimer, the term of this patent is extended or adjusted under 35 U.S.C. 154(b) by 0 days.

(21) Appl. No.: 09/536,356

(22) Filed: Mar. 27, 2000

(30) Foreign Application Priority Data

Mar. 31, 1999 (DE) .......................................... 199 14 751

(51) Int. Cl.$^7$ ................................................ B01J 37/08
(52) U.S. Cl. ........................ 502/85; 502/104; 502/107; 502/28; 502/38; 526/352; 526/905; 526/114; 526/154; 526/156
(58) Field of Search ................. 502/104, 107, 502/85, 28, 38; 526/352, 905, 114, 154, 156

(56) References Cited

U.S. PATENT DOCUMENTS

| | | | |
|---|---|---|---|
| 3,953,175 A | 4/1976 | Pulak | |
| 5,356,845 A | * 10/1994 | Clavenna et al. | ............. 502/21 |
| 5,455,216 A | 10/1995 | Mueller et al. | |

FOREIGN PATENT DOCUMENTS

| | | |
|---|---|---|
| DE | 38 20 947 | 12/1989 |
| GB | 849929 | * 9/1960 |

* cited by examiner

*Primary Examiner*—David W. Wu
*Assistant Examiner*—Ling-Siu Choi
(74) *Attorney, Agent, or Firm*—Connolly Bove Lodge & Hutz LLP

(57) ABSTRACT

A method for the treatment of catalyst or catalyst support material in an apparatus in which the treatment is carried out continuously in such a way that the physical and/or chemical conditions change during entry of the catalyst or catalyst support material into the apparatus and/or during exit thereof from the apparatus and/or the catalyst or catalyst support material is transported in the apparatus through zones (5, 6, 7) having different physical and/or chemical conditions.

9 Claims, 3 Drawing Sheets

METHOD AND APPARATUS FOR THE CONTINUOUS TREATMENT OF CATALYST AND CATALYST SUPPORT MATERIAL

The invention relates to a method for the continuous treatment of catalyst and catalyst support material, and to the use of the process products in the preparation of polyolefins.

The following deals with methods for the treatment of catalysts, initiators, catalyst support materials, initiator support materials and support materials treated with initiators or catalysts. Although a strict differentiation must be made between the definition of initiators and catalysts, the term "catalysts" used below is also taken to mean initiators. It can frequently only be ascertained with difficulty whether a reaction is initiated or catalyzed. Accordingly, support materials treated with active components—for example catalysts—are also referred to below as catalysts.

The treatment of catalysts or catalyst support materials is generally carried out either in the form of calcination or activation. In industry, discontinuous fluidized-bed methods are usually employed for carrying out the treatment of catalysts or catalyst support materials in the form of particles.

For the treatment of catalyst support materials or catalysts, for example for their use in the polymerization of olefins, use is then generally made of fluidized-bed reactors in which the particles are agitated by an upwardly directed gas stream with which they are in intense material and heat exchange. The particles are usually heated in the course of the process and undergo a physical/chemical change. When the conversion is complete, the particles are cooled and discharged from the reactor.

A problem which frequently occurs in these methods is the formation of fine dust, which is attributable, in particular, to comminution of particles. The formation of fine dust prevents the formation of material of uniform quality, but uniform quality is usually desired.

The discontinuously operated fluidized-bed reactors described above are usually of considerable size (typical internal volume in the order of about $10^3$ m$^3$) in industrial practice owing to the necessity for an adequate capacity, since a fluidized bed can accommodate only comparatively little solid per volume unit. The material consumption for the construction of the reactors is thus correspondingly high. On the other hand, the large weight of the fluidized-bed reactors results in long heating and cooling periods associated with the treatment. The heating and cooling operations firstly cause high energy consumption and secondly promote reactor wear due to material fatigue.

The object of the invention is therefore to improve the above-described method for the treatment of catalyst or catalyst support material in such a way that particles of more uniform quality are produced, that the expenditure on the apparatus is reduced, and that heating and cooling periods are shortened.

The object is achieved by a method for the treatment of catalyst or catalyst support material in an apparatus in which the treatment is carried out continuously in such a way that the physical and/or chemical conditions change during entry of the catalyst or catalyst support material into the apparatus and/or during exit thereof from the apparatus and/or the catalyst or catalyst support material is transported in the apparatus through zones having different physical and/or chemical conditions.

The continuous treatment of the catalyst or catalyst support material can in principle be carried out in any desired manner. It is typical of all methods that the catalyst or catalyst support material is conveyed in the apparatus through zones in which different physical and/or chemical conditions prevail, the individual methods usually differing through the manner of conveying. In this connection, the term "physical conditions" is taken to mean, in particular, the temperature, the pressure and the flow conditions, while the term "chemical conditions" is taken to mean, in particular, the gases, liquids or solids acting on the catalyst or catalyst support material. The physical and/or chemical conditions can change continuously or more suddenly. In principle, the physical and/or chemical conditions can also change only at the entry point and/or exit point of the apparatus, in which case the conditions in the reactor undergo virtually no further change. In this case, the reactor contains only one zone, with the catalyst or catalyst support material to be treated experiencing changes in the conditions during entry into the apparatus and/or during exit from the apparatus. The various zones in the apparatus or the single zone correspond in principle to the treatment stages of the corresponding discontinuous method. The catalyst or catalyst support material passes through the proposed sequence of corresponding zones during the treatment. In the ideal case, a particularly uniform quality is produced. No backmixing then takes place, and the residence times in the individual zones are constant.

A continuous mode of operation has the advantage over a discontinuous mode of operation that the space-time yield of the treatment is greater. The size of the apparatus for the treatment of the catalyst or catalyst support material in a continuous method can thus be significantly reduced. A smaller apparatus means less consumption of materials and thus a cost saving.

A further advantage of the continuous treatment method is that there are no cooling and heating periods. This results firstly in the comparatively high space-time yields, and secondly the energy consumption of the method is reduced and in addition wear of the apparatus due to material fatigue is countered. It is surprising that the treated catalyst or catalyst support material particles are not damaged during the rapid cooling and/or heating, meaning that the continuous treatment is not accompanied by the formation of fine dust. It is thus possible to omit at least some removal elements.

It is of particular importance that material of more uniform quality is produced in the continuous treatment method compared with the discontinuous method. In general, different batches based on the same discontinuous treatment method have different qualities from one another. Accordingly, not only the uniformity of the quality within a batch, but also the uniformity of the quality between different batches must be checked in the discontinuous method.

In the various conveying methods of the catalyst or catalyst support material through zones or through the single zone of the apparatus, a distinction can be made between conveying in a fluidized bed and in a fixed bed.

In the case of conveying in a fluidized bed, the catalyst or catalyst support material is generally also treated in the fluidized bed. The fluidized bed containing the catalyst or catalyst support material is preferably conveyed in the apparatus through zones in which different physical and/or chemical conditions prevail. The fluidized bed containing the catalyst or catalyst support material can alternatively be conveyed through only one zone, in which uniform physical and/or chemical conditions then prevail.

The material to be treated can also be transported in a fixed bed. The catalyst or catalyst support material is then generally treated in the bed during the conveying. The bed containing the catalyst or catalyst support material is preferably conveyed with the aid of a conveying device through zones (in the extreme case through the single zone) in which different physical and/or chemical conditions prevail. The conveying device can have, for example, a conveyor belt and/or a revolving tube and/or a turntable and/or a non-moving, vertical tube with fixed internals.

The catalyst or catalyst support material treated by the method according to the invention is employed, in particular, in the polymerization of olefins, with the particles to be treated generally being fed to the reactor in the form of solid particles. Polyolefin catalysts of this type frequently contain doped support materials (for example based on silica gel). The active components here are, for example, transition metals, such as chromium or titanium. Support materials can be, for example, oxidic compounds, such as silica, alumina, silica-alumina, zirconia, thoria, fluorinated silica, fluorinated alumina, fluorinated silica-alumina, boron oxides or mixtures thereof. An additional surface modification of the support materials may be particularly advantageous. The treatment of the catalyst or catalyst support material is generally a calcination and/or activation.

During the treatment, additional gases (besides the carrier gas in the fluidized-bed method) and, in addition to the particles originally introduced, also additional solid can be introduced into the fluidized bed or into the fixed bed. This introduction can take place at any time at any desired locations at installed feed points. Examples of suitable additional gases are oxygen, carbon dioxide, chromyl chloride (or alternatively other active components) or steam, while examples of additional solids which can be employed are ammonium hexafluorosilicate, untreated catalyst support or catalysts having a different physical/chemical structure. In addition, liquids, for example water, can be sprayed into the fluidized bed or onto the fixed bed at any time at any desired feed points. Thus, liquids, additional solids and/or additional gases can be employed in the treatment.

In principle, the method according to the invention can also be used for the treatment of catalysts or catalyst support materials which are not in the form of particles (in which case neither a fluidized bed nor a fixed bed is present), but are, for example, in the form of solid blocks. In such a case, the use of a suitable conveying device, such as, for example, a conveyor belt, is generally advantageous.

In the drawings:

FIGS. 3a–d show cross sections through various internals of the revolving tube;

Figure 1:
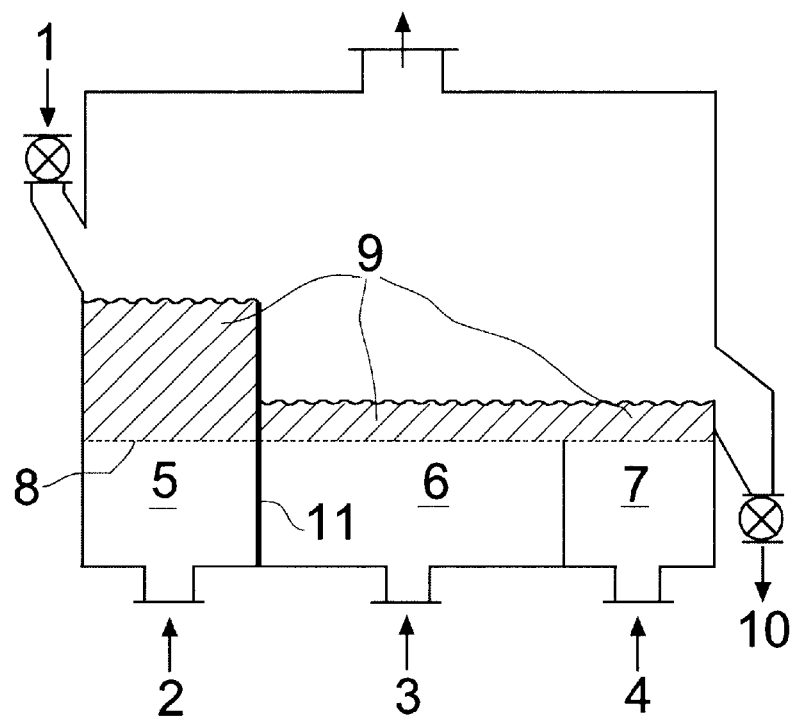
FIG. 1 shows a simplified sketch of a cross section through an apparatus containing various fluidized beds.

In the apparatus shown in FIG. 1, the material to be treated is fed in via the feed device 1. Through the supply of gas at gas inlet points 2, 3 and 4, a fluidized bed 9 is generated in the zones 5, 6 and 7 above a perforated tray 8. The material is transported in the moving fluidized bed to the discharge device 10 ("in a similar manner to suspended matter in a river"), the fluidized bed flowing from zone 5 to zone 6 over a barrier 11. Different physical and/or chemical conditions preferably prevail in zones 5, 6 and 7. For example, the material is warmed in zone 5 with supply of hot air, activated in zone 6 on contact with another hot gas, and cooled in zone 7 with supply of cold nitrogen.

Figure 2:
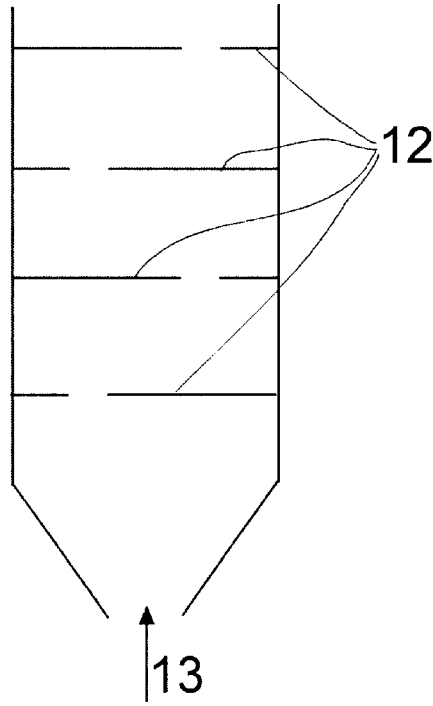
FIG. 2 shows a sketch of a cross section through a column-like fluidized-bed apparatus.

In the column-like fluidized-bed apparatus shown in FIG. 2, various chambers in which a fluidized bed can form are separated off by horizontal plates 12 in a generally vertical tube. The chambers are connected via openings in the plates, which are generally not one above the other. The carrier gas is blown in through the gas inlet 13 at the lower end of the apparatus and fed in countercurrent to the solid to be treated, which is fed in at a point 14 in the upper region of the apparatus.

Figure 3:
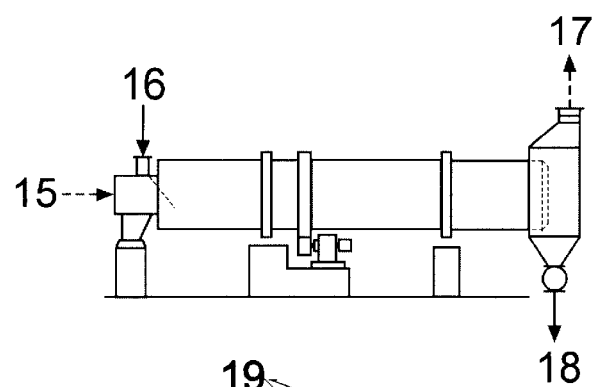
FIG. 3 shows a sketch of a revolving tube.

In the revolving tube shown in FIG. 3, the particles are fed from one end of the tube with the gas inlet 15 and the particle feed device 16 to the other end of the tube with the gas outlet 17 and the discharge device 18. The revolving tube here can be fitted with internals 19, which simplify continuous transport (without back-mixing) and effective cross-mixing of the particles. Within the revolving tube, zones can exist in which different physical and/or chemical conditions prevail (for example a temperature gradient within the longitudinal axis of the tube).

Figure 4:
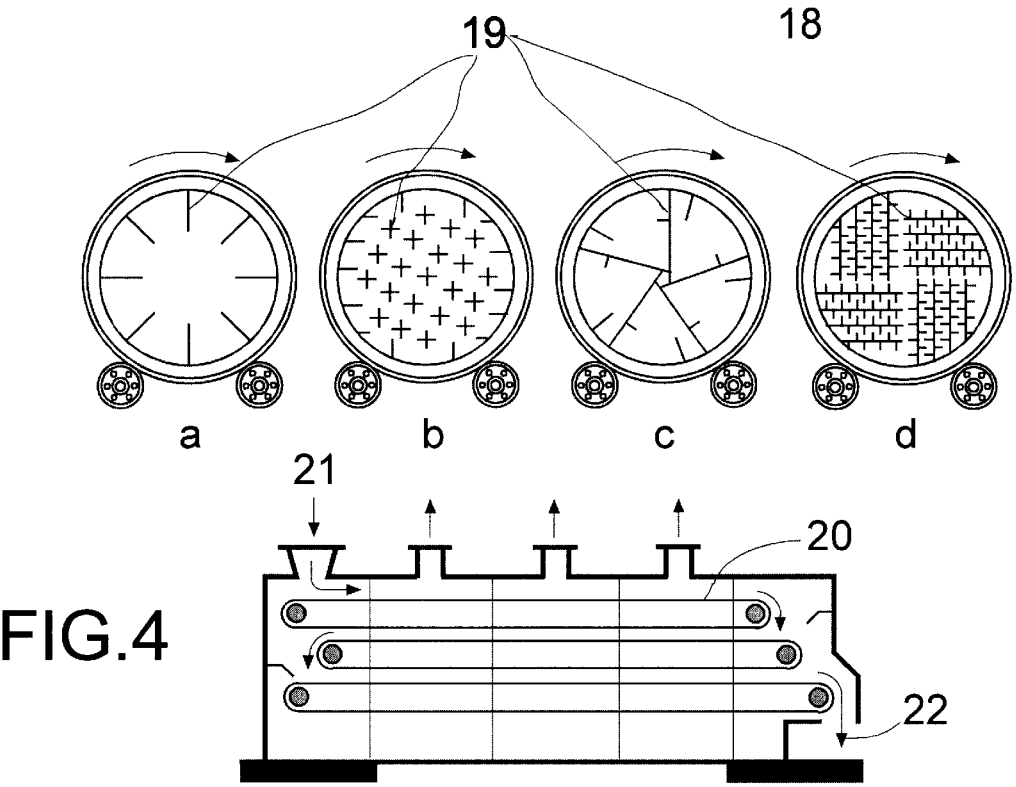
FIG. 4 shows a sketch of a cross section through a conveying device with conveyor belt.

In the conveying device shown in FIG. 4, the particles are transported from a charging device 21 through a space to a discharge device 22 by means of a conveyor belt 20. The treatment takes place within the space during the transport operation. Gases can be blown into the space at various points (for example a cold inert gas for cooling the particles in the region of the discharge device 22).

Figure 5:
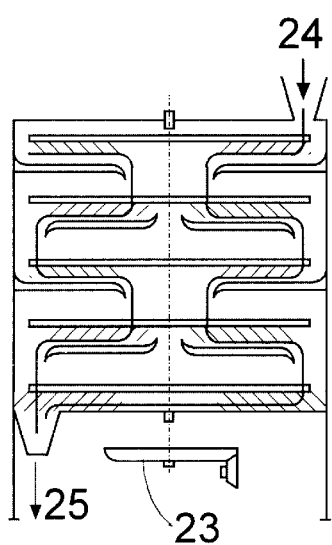
FIG. 5 shows a sketch of a cross section through a conveying device with turntable.

The conveying device shown in FIG. 5 has a turntable 23, with the aid of which the particles are transported from a charging device 24 to the discharge device 25, the particles being conveyed from higher stages to lower stages by gravity. The device can, for example, be externally heated.

Figure 6:
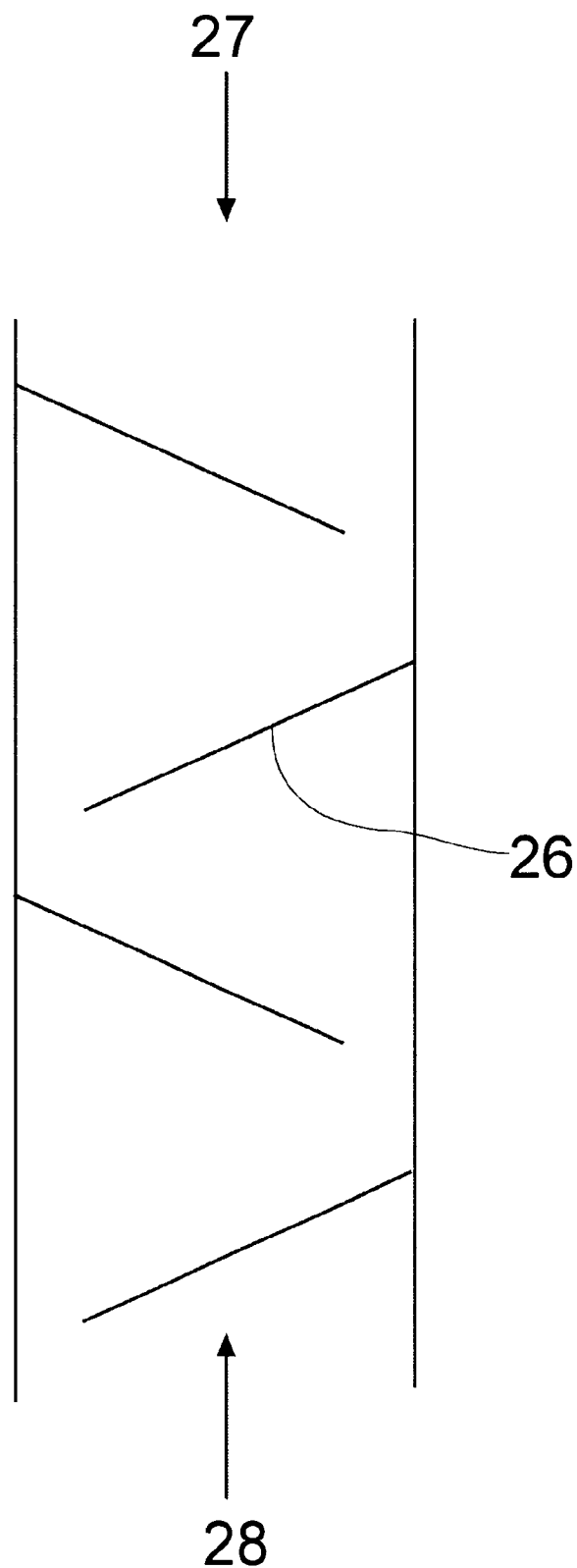
FIG. 6 shows a sketch of a cross section through a vertical tube with fixed internals which generates a moving bed.

The non-moving, vertical tube shown in FIG. 6 contains fixed internals 26 (for example built-in plates which point downward at an angle), which are arranged in such a way that particles can "slide" downward from a charging device 27 in the upper region of the tube, it being possible, if desired, for one or more gases to be fed upward, in countercurrent to the particles, from a point 28, which is preferably in the lower region of the tube. A so-called moving bed then exists.

The treatment in accordance with the method according to the invention is described in greater detail below with reference to a working example.

EXAMPLE (Continuous Method):

A polymerization catalyst (0.2% by weight of Cr(III) $(NO_3)_3$ on a silica gel) was activated in a revolving tube. An electrically heatable revolving tube with upstream gas mixing station was employed. The polymerization catalyst (precursor) was introduced directly into the revolving tube, which was pre-heated to 600° C., from a storage container by means of a conveying screw. After the residence time of 2 hours had been set, the activated product was emptied out of the hot apparatus into a receiver flushed with nitrogen (the nitrogen had a temperature of about 20° C.) with the aid of an electromechanical tilt adjustment device, with the nitrogen being fed in countercurrent to the particles falling into the receiver (cooling effect).

COMPARATIVE EXAMPLE (Discontinuous Method):

The same polymerization catalyst (precursor) was activated in a quartz fluidized-bed reactor in the "classical manner" (discontinuous method, as described in the introduction). In the reactor, 200 g of polymerization catalyst (precursor) were heated from room temperature to 600° C. over the course of 3 hours, held at the temperature of 600° C. for 2 hours and subsequently (under a nitrogen atmosphere) cooled to room temperature over the course of 10 hours.

The table below shows a comparison of the particle size distributions based on the continuous method according to the invention and the classical discontinuous method.

| Treatment | Particle size distributions[1] of the polymerization catalyst (precursor)[2] | | | | | | |
|---|---|---|---|---|---|---|---|
| | Activation program | Hold temperature | Hold time | Median μm | <20.2 μm | <32 μm | >80.7 μm |
| Untreated material[2] | | | | 60.9 | 0.1 | 1.4 | 7.6 |
| Fluidized bed method | heat - hold - cool | 600° C. | 2 h | 60.6 | 0.1 | 0.7 | 6.0 |
| Revolving tube (continuous) | heat - hold - cool | 600° C. | 2 h | 60.7 | 0.1 | 0.9 | 6.2 |

[1]Measurement method: Coulter Counter, pretreatment: 30 seconds ultrasound, electrolyte: 49.5% water, 49.5% glycerol, 1% NaCl, capillary: 560 μm, operating mode: manual
[2]Polymerization catalyst (precursor) containing 0.2% by weight of Cr(III) $(NO_3)_3$ on a silica gel It can be seen that the activation according to the invention has not damaged the catalyst material. The particle size distribution scarcely differs from the activation by the discontinuous method.

Note: the term "polymerization catalyst (precursor)" is taken to mean a polymerization catalyst which, owing to the lack of activation, is not yet suitable for use.

What is claimed is:

1. A method for the treatment of a chromium containing catalyst or chromium containing catalyst support material for the polymerization of olefins in an apparatus in which the treatment is carried out by continuously transporting the chromium containing catalyst or chromium containing catalyst support material through zones (1, 5, 6, 7, 10) having different physical and/or chemical conditions.

2. A method as claimed in claim 1, wherein the catalyst or catalyst support material is treated in the apparatus in a fluidized bed (9).

3. A method as claimed in claim 2, wherein the fluidized bed (9) containing the catalyst or catalyst support material is conveyed in the apparatus through zones (5, 6, 7) in which different physical and/or chemical conditions prevail.

4. A method as claimed in claim 1, wherein the catalyst or catalyst support material is in the form of particles and is treated in the apparatus in a fixed bed.

5. A method as claimed in claim 4, wherein the fixed bed containing the catalyst or catalyst support material is conveyed with the aid of a conveying device through zones in which different physical and/or chemical conditions prevail.

6. A method as claimed in claim 5, wherein the conveying device has a conveyor belt (20) and/or a revolving tube and/or a turntable (23) and/or a non-moving, vertical tube with fixed internals (26).

7. A method as claimed in claim 1, wherein the treatment of the catalyst or catalyst support material is carried out in the form of an activation.

8. A method as claimed in claim 1, wherein the treatment of the catalyst or catalyst support material is carried out in the form of a calcination.

9. A method as claimed in claim 1, wherein liquids, additional solids and/or additional gases are employed in the treatment.

* * * * *